United States Patent [19]

Ginnasi

[11] Patent Number: 4,993,937

[45] Date of Patent: Feb. 19, 1991

[54] APPARATUS FOR THE FEEDING AND DISCHARGE OF A HEATING-PLATE PRESS

[75] Inventor: Claudio Ginnasi, Milan, Italy

[73] Assignee: Simpianti S.r.l., Milan, Italy

[21] Appl. No.: 355,904

[22] Filed: May 22, 1989

[30] Foreign Application Priority Data

May 24, 1988 [IT] Italy ................................ 20723A/88

[51] Int. Cl.[5] ........................ B29C 43/34; B29C 43/50

[52] U.S. Cl. .................................... 425/444; 100/215; 100/218; 198/689.1; 414/225; 414/279; 414/752

[58] Field of Search ...................... 198/750, 753, 689.1; 414/751, 752, 222, 225, 266, 277, 279, 627; 72/422; 425/436, 444, 121, 126.1, 406; 100/196, 193, 207, 215, 218

[56] References Cited

U.S. PATENT DOCUMENTS

| | | | |
|---|---|---|---|
| 3,761,337 | 9/1973 | Hütter | 100/196 |
| 4,253,891 | 3/1981 | Brussel | 414/752 |
| 4,424,094 | 1/1984 | Salenz | 100/196 |
| 4,479,841 | 10/1984 | Rapp et al. | 156/379.8 |
| 4,527,938 | 7/1987 | Leavitt | 100/196 |
| 4,580,964 | 4/1986 | Repella | 414/751 |

*Primary Examiner*—Willard E. Hoag
*Attorney, Agent, or Firm*—Peter K. Kontler

[57] ABSTRACT

An apparatus for the feeding and discharge of a heating-plate press, a movable carriage introducible into the press space being provided at the front side of the press, and this carriage having, at its underside, means for lifting the workpieces processed in the press from the lower press plate and, on its topside, a bearing surface for receiving the workpieces to be introduced into the press.

11 Claims, 5 Drawing Sheets

APPARATUS FOR THE FEEDING AND DISCHARGE OF A HEATING-PLATE PRESS

BACKGROUND OF THE INVENTION

The invention relates to a feed and discharge apparatus for board-shaped workpieces for a heating-plate press.

Conventionally, presses of this type, having a working space and used for the finishing of board-shaped workpieces in the furniture industry, possess, on their entry side, a feed apparatus composed, for example, of a driveable band, a discharge apparatus also being arranged on the exit side of the press.

The provision of a feed apparatus at the entrance of the press and the provision of a discharge apparatus at the exit of the press entails a need for a considerable amount of space to arrange the feed apparatus and discharge apparatus, and this space is often not available.

Furthermore, presses equipped with a metal band or a plastic band have become known, this band interacting with the lower press plate and providing the possibility of introducing the workpieces to be pressed into the interior of the press. However, an apparatus of this type cannot be employed when the press is used for the finishing of board-shaped workpieces with decorative papers impregnated with melamine resin, since in this case the introduction of the workpieces and the slow depositing of these on the lower press plate exerts an undesirable uneven influence on the glue layer as a result of the hot plate surface of the press and the heat action takes effect even before the press plates are brought together.

It is known that, when, for example, melamine resin glues are used, it is necessary to deposit the board-shaped workpiece to be pressed on the lower press plate as quickly as possible, to allow the press to be closed in the shortest possible time, so that the press force can act on the board-shaped workpiece before the glue layer starts its chemical reaction as a result of the action of heat. It is known to an average person skilled in the art that heat and press force should, if possible, act simultaneously on the glue layer, or at any rate the time interval between heat action and pressing operation is reduced to a minimum.

However, known presses have feed apparatuses and discharge apparatuses which are such as to prevent these apparatuses from working simultaneously, because, in the known apparatuses, first the discharge apparatus is introduced into the press and, after the press space has been emptied, it becomes possible to introduce the board-shaped workpieces by means of a second apparatus, in particular the feed apparatus, and thereafter this apparatus has to be removed empty from the press. Conducting the feed and discharge operation with different apparatuses requires considerable time and the efficiency of the press falls appreciably.

OBJECT OF THE INVENTION

The object of the present invention is to provide an apparatus, by means of which it is possible to feed a press of the type mentioned from one side and discharge the pressed workpieces on the same side of the press and to guarantee that both the feed operations and the discharge operations are carried out very quickly, in order to prevent the board-shaped workpieces from coming in contact with the heated lower press surface only very gradually and slowly and provide the possibility of removing the workpieces processed in the press from the latter quickly, without thereby running the risk of damaging the sensitive surfaces of the finishing material.

SUMMARY OF THE INVENTION

The object according to the invention is achieved because a carriage introduceable into the press space and removable from this space is provided at least on one side of a heating-plate press, because this carriage has an upper surface for the introduction of the board-shaped workpieces into the press, and because on the underside of the carriage there is a second plane which is equipped with gripper members for grasping, lifting and removing the pressed workpiece.

By means of an apparatus of the type described, it becomes possible to do away with a separate discharge apparatus on the exit side of the press. The board-shaped workpieces arranged on the upper surface of the movable carriage can be deposited on the lower plate plane of the press, without a gradual heat action taking effect before the press force is exerted, and furthermore the provision of lifting means on the underside of the carriage movable to and fro provides the possibility of lifting the finished board-shaped workpieces from the lower press plate, with the result that a removal from the press without any rubbing contact between the workpieces and the lower plate becomes possible.

The invention affords the essential advantage that, by means of the apparatus according to the invention which serves both for the introduction of the workpieces and for the removal of the pressed workpieces, the feed operation and the discharge operation are as short as possible in terms of time and a single apparatus is used for both operations, thus substantially reducing the costs of these auxiliary apparatuses, but at the same time increasing the efficiency of the press.

Further features and advantages of the invention are pointed out in the following description and are illustrated in the accompanying drawings in which the apparatus according to the invention is shown diagrammatically.

DESCRIPTION OF THE PREFERRED EMBODIMENTS

Figure 1:
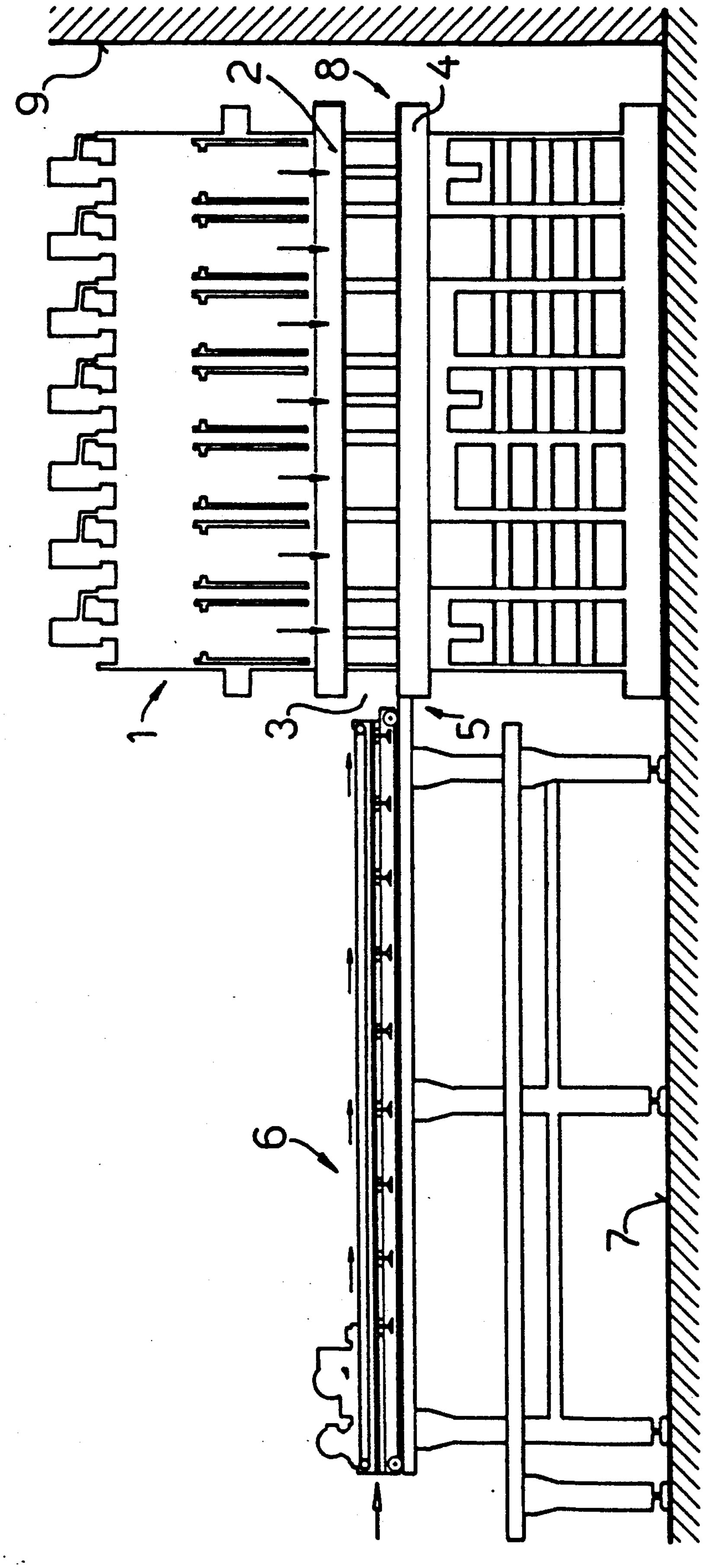
FIG. 1 shows diagrammatically a heating-plate press with the combined feed and discharge apparatus according to the invention on one side of the press.

As can be taken from FIG. 1, the press 1 has an upper heating plate 2. This press plate 2 can be lowered by means of hydraulic cylinders for the pressing operation. The underside of the press space or chamber 3 of the press 1 is closed off by a heated press plate 4 which is conventionally arranged in a stationary manner.

A movable feed and discharge carriage 6 is arranged on the entry side 5 of the press 1. As can be taken especially from FIG. 1, the press 1 and the carriage 6 are arranged above the floor 7 by means of a corresponding underframe. Since the press does not interact with a conventional discharge apparatus on the side intended as a workpiece exit 8, the press 1 can advantageously, if required, be arranged in the immediate vicinity of a wall designated by 9.

By the use of a carriage, the bearing surface at the upper side of which serves for the feeding of the board-shaped workpieces to be pressed, and by the provision of a second carriage plane or underside with gripping means for removing the pressed workpieces, it becomes possible to do away with a separate discharge apparatus. Due to the "feed" and "discharge" functions combined in a single apparatus, considerable time is saved during the feed operation and during the discharge operation. The carriage according to the invention moves into the press space for feeding the board-shaped workpieces to be pressed, and simultaneously, during the removal movement, a lifting and removal of the previously pressed board-shaped workpieces take place.

Figure 2:
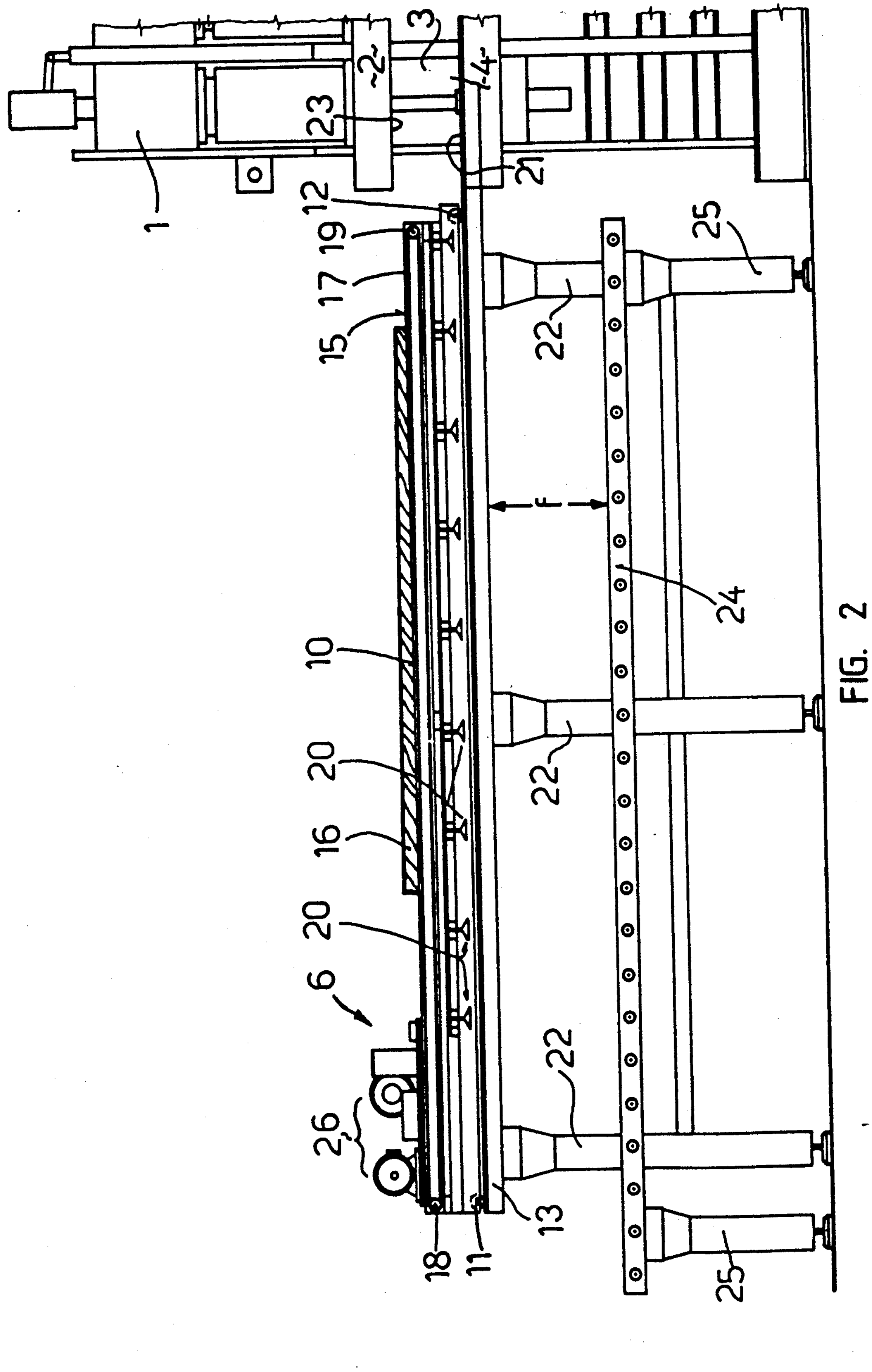
FIG. 2 shows a front view of the entry side of the press with the feed and discharge apparatus.

The apparatus for the feeding and discharge of the board-shaped workpieces, which is designated as a whole by 6, is located on the entry side 5 of the press 1 and is composed essentially of a movable carriage 10 (FIG. 2).

The carriage 10 has track rollers 11 and 12, by means of which the carriage is movable on rails 13, these rails being arranged on the two longitudinal sides of the press space 3 of the press 1. The upper side of the carriage 10 forms a bearing plane 15 which receives the board-shaped workpiece or workpieces 16 to be fed to the press space 3 of the press 1. The bearing plane 15 can be designed as a stationary plane or can be equipped with an endless band 17 guided over rollers 18 and 19. Under the bearing surface 15, the carriage 10 has gripping means 20, for example a number of pneumatic suckers which are arranged above the plane 21 of the lower plate 4 of the press 1. The plane 15 of the carriage 10 for receiving the board-shaped workpieces 16 is arranged below the plane 23 of the upper press plate 2. Advantageously, the rails 13 are received by supporting columns 22. A roller conveyor 24 supported by legs 25 is arranged under the apparatus 6. The roller conveyor 24 is advantageously connected operatively to drive pistons (not shown). These drive pistons make it possible to lift and lower the roller conveyor 24 in the direction of the arrow f in order to receive and convey away the pressed workpieces.

A drive device designated as a whole by 26 is connected to the apparatus 6. The drive device 26 is composed, for example, of a controllable motor and of a reduction gear connected operatively, for example via a gear wheel, to a rack which is arranged parallel to the rails 13 and which provides the possibility of introducing the apparatus 6 into the press space 3 of the press 1 and of removing the carriage from the press 1. The drive device 26 can interact with a positioning means and with a position detection device known per se, in order thereby to make it possible to obtain an exact and controlled positional arrangement of the carriage 6 relative to the press space 3 of the press 1.

Figure 4:
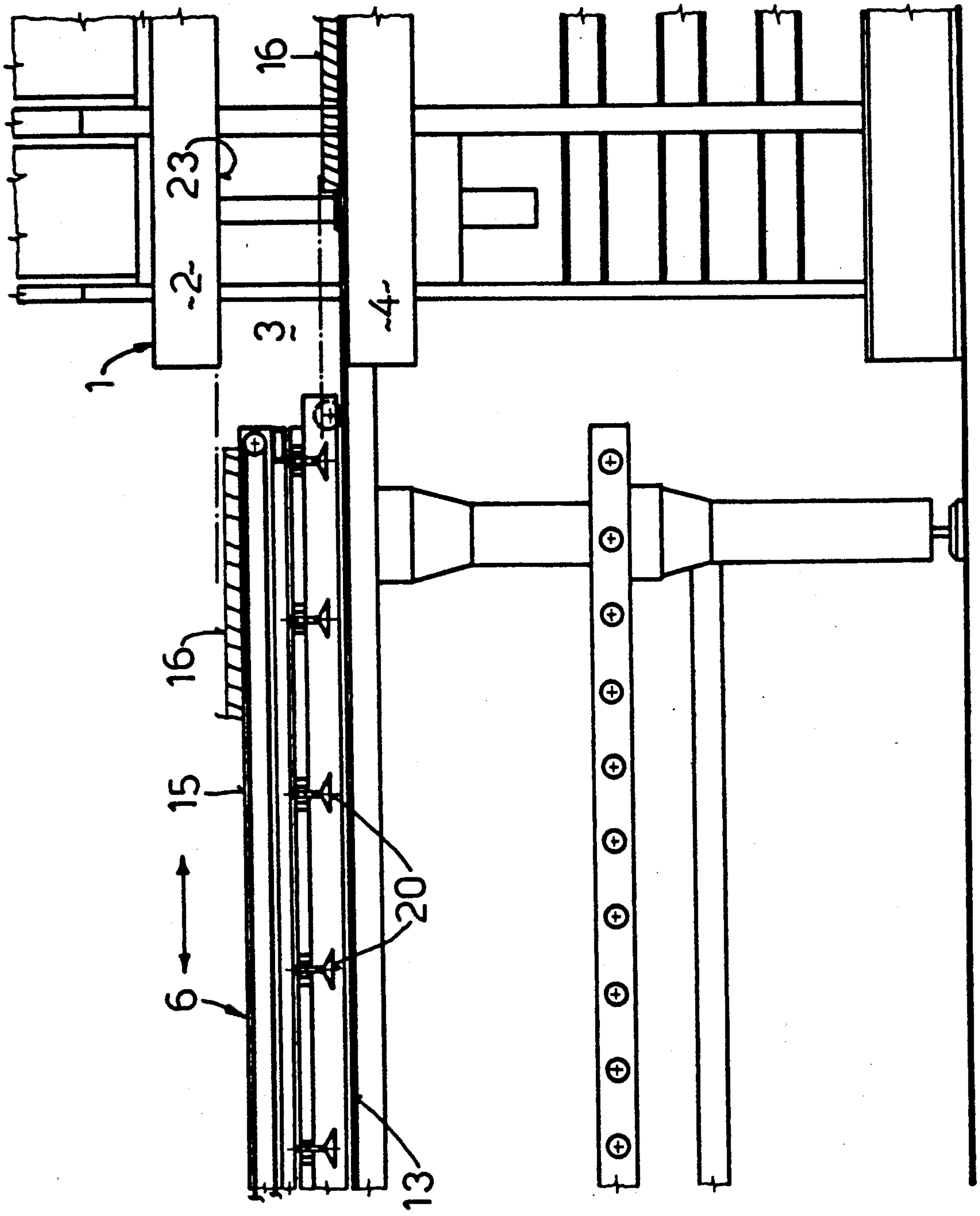
FIG. 4 shows parts of the press and parts of the feed and discharge apparatus on an enlarged scale.

As can be taken from FIG. 4, the apparatus 6, which is advantageously composed of sectional pieces or metal tubes welded together, possesses suckers 20 on its underside. These suckers 20 are connectable to a vacuum source. Furthermore, the suckers 20 are made vertically adjustable, to guarantee that the elastically constructed suction bodies always come to rest at a low height, above the board-shaped workpiece 16 arranged in the press to space or chamber 3.

The topside 15 of the carriage 6 is also arranged relative to the press 1 in such a way that the board-shaped workpiece 16 always comes to rest below the lower surface 23 of the plate 2 of the press 1. This guarantees, during the operation of introducing the carriage 6 into the press space 3, that the suckers never come in contact, in their position of rest, with the upper surface of the plate 16 in the press space 3, and that the lower surface of the plate 16 also does not come into contact with the surface 23 of the lower press plate 2 (during the operation of introducing the carriage 6). This prevents the possibility that the board-shaped workpieces will suffer damage, such as, for example, scratches or indentations, during the movement of introduction into the press space.

Furthermore, the board-shaped workpiece 16 resting on the plane 15 of the carriage 6 is prevented from coming in contact with the heated press plate 4 only gradually. As already described previously, this would trigger the immediate chemical reaction of the adhesive before the press is closed and before a pressure force is exerted on the board 16.

On the longitudinal sides of the press 1 and parallel to the rails 13, the press 1 possesses, as is known from the state of the art, a number of controllable gripping tongs 14 which, after the carriage 6 has been introduced into the press space 3, grasp the board-shaped workpiece 16 and lift it a few millimeters from the plane 15 of the carriage, together with the coating laminates (not shown) which are to be glued on.

Figure 3:
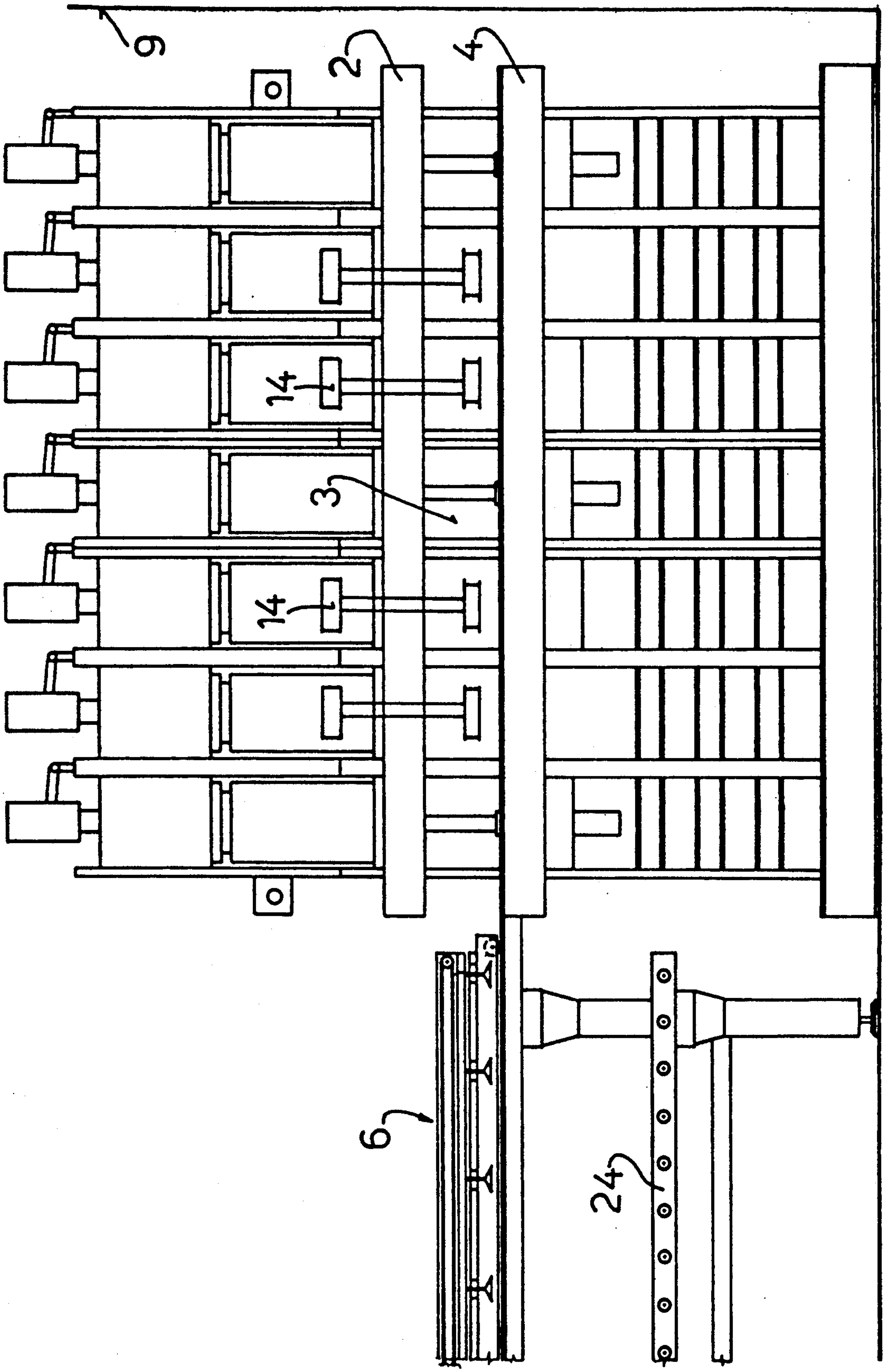
FIG. 3 shows diagrammatically a one-daylight press with the feed and discharge apparatus according to the invention.

The tong-like grippers 14 are shown only diagrammatically in FIG. 3, since devices of this type for the grasping and depositing of a board-shaped workpiece, together with the associated coating materials, on a lower press plate belong to the general state of the art.

The suckers 20 (after the introduction of the carriage 6 into the press space 3 of the press 1) are controlled in such a way that they come to bear on the upper surface of the board-shaped workpieces 16, deposited on the lower plate 4 of the press 1, and after a vacuum has been generated in the suckers 20 there is a control operation, by means of which the board 16 is lifted a short distance, in order to make it possible for the apparatus 6, together with the lifted board 16, to be removed from the press space and in order to prevent the possibility that the lower side of the workpiece will rest on or rub against the lower press plate 4 of the press. As can be taken from FIG. 4, in the position in which the carriage 6 is removed from the press as far as possible, underneath the carriage 6 there is a roller way which can be raised or lowered in order to receive the board-shaped workpieces removed from the press space 3 (with the aid of the suckers 20).

The functioning of the apparatus according to the invention will be described with reference to FIGS. 5 to 8:

At the end of a press cycle, the plates 2 and 4 of the press 1 are moved at a distance from one another, thus allowing access to the press space 3 of the press 1. A ready-pressed board-shaped workpiece 16 is located on the lower plate 4. In this phase, the carriage 6 moves into the plate space 3 of the press 1, together with a prepared board-shaped workpiece 16 arranged on the top-side 15 of the carriage. The plates 2 and 4 are placed at such a distance from one another that it is made possible for the carriage 6 to move into the press space 3 of the press 1, without the board 16 thereby coming in contact with the plate 2, and without the suckers 20 coming in contact with the board-shaped workpiece 16 resting on the lower plate 4 of the press 1.

Figure 5:
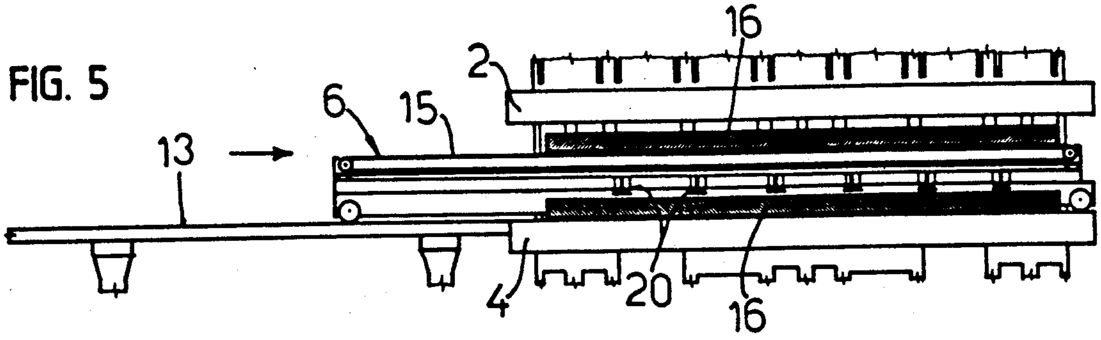
FIG. 5 shows diagrammatically the step of feeding a board-shaped workpiece into the press space.
Figure 6:
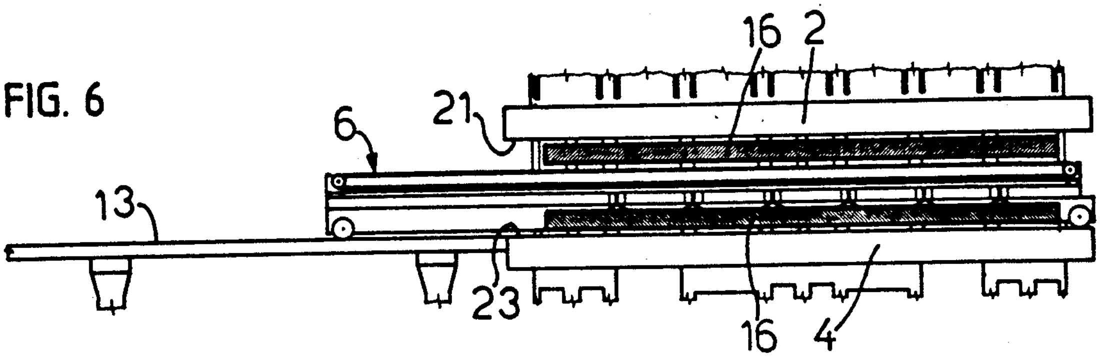
FIG. 6 shows diagrammatically the lifting of the introduced workpiece from the upper surface of the carriage and the lifting of the pressed workpiece from the lower press plate.

As soon as the carriage 6 is in a position according to FIG. 5 in the press space 3 of the press 1, the gripper tongs 14, known from the state of the art, which are arranged on the longitudinal sides of the press plates 2 and 4 are actuated. These gripping tongs 14, not shown in detail, grasp the board-shaped workpiece 16 resting on the surface 15 of the carriage 6. Subsequently, the board-shaped workpiece 16 is lifted by a specific amount. At the same time, the suckers 20 execute a downward movement and come in operative contact with the surface of the board-shaped workpiece 16 resting on the lower press plate 4. As a result of the generation of a vacuum in the suckers 20, the board-shaped workpiece 16 can be lifted a few millimeters from the lower press plate 4 of the press 1.

Figure 7:
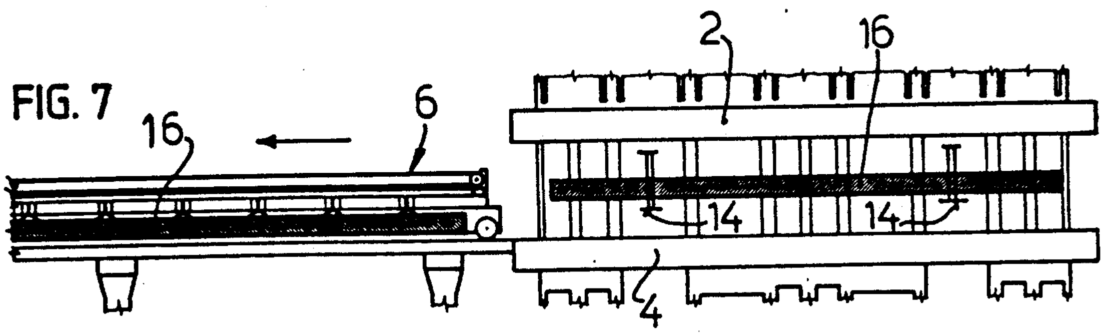
FIG. 7 shows diagrammatically the removal operation of the feed and discharge carriage with the board-shaped workpiece to be pressed being in the lifted position and with the pressed workpiece which is being removed from the press space.

Thereafter, as can be taken from FIG. 7, the carriage 6 is moved out of the press 1 and the board-shaped workpiece 16, hitherto held by the suckers 20, is deposited. During the removal movement of the carriage 6, the board-shaped workpiece 16 grasped by the gripper tongs 14 is held suspended in the vicinity of the upper press plate 2.

Figure 8:
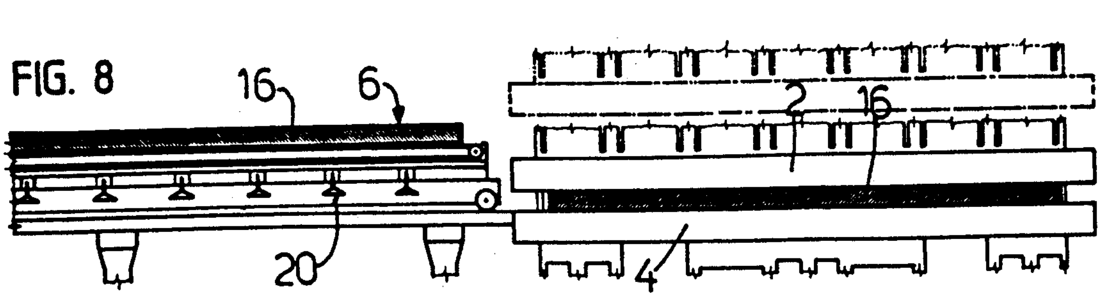
FIG. 8 shows the closing operation of the press and the preparation of a new board-shaped workpiece for feeding the press space.

After the complete removal of the carriage 6 from the press 1, the board-shaped workpiece 16, hitherto held by the suckers 20, is deposited, for example, onto the roller conveyor 24 or onto another suitable conveying means. At the same time, the board-shaped workpiece 16, which has been held suspended in the press space 3 of the press 1 by the gripper tongs, is deposited onto the lower press plate 4 in the plane 21. Thereafter, the press 1 is closed quickly, as shown in FIG. 8, in order to transmit heat and pressure simultaneously to the surfaces of the board-shaped workpiece 16 and thus achieve a perfect pressing result. This is especially important in those cases where the board-shaped workpiece 16 to be processed is to be coated with decorative sheets of melamine resin.

While the press remains closed for approximately 40–60 seconds in order to carry out the pressing operation, a further board-shaped constructional part 16 is prepared on the surface 15 of the carriage 6 located outside the press, which is to be introduced thereafter into the space 3 of the press 1.

The press cycle is then repeated in the same sequence as shown in FIGS. 5 to 8.

By means of the feed and discharge apparatus 6 according to the invention, it therefore becomes possible to do away with a separate discharge apparatus which would have to be provided on the press exit side 8 (FIG. 1). The press equipped with the apparatus 6 according to the invention can consequently be arranged in the immediate vicinity of a wall 9, the space required for the press being reduced substantially.

By avoiding a pure feed apparatus provided at the entrance 3 of the press, together with a separate discharge apparatus at the exit of the press, not only are the production costs lowered, but at the same time the feed and discharge operation can be carried out at a higher speed, thus substantially increasing the output of the press 1. This is because, in practice, the feeding of a board-shaped- workpiece now takes place simultaneously with the discharge of a board-shaped and pressed workpiece. In fact, the movement of the carriage 6 into the press space 3 of the press 1 is utilized to introduce a workpiece 16 to be pressed, and the removal movement of the carriage 6 is utilized to remove a readypressed board-shaped workpiece 16 from the press. This becomes possible because, according to the invention, the apparatus 6 for the feed and discharge of the boards has two planes 15 and 20 arranged above one another, that is to say a plane 15 used for introducing the board-shaped workpiece 16 into the press 1, and a lower plane equipped with suckers 20 or similar suitable gripping means for the removal of the board-shaped workpiece 16.

Whilst hitherto only a single apparatus for the feed and discharge on one side of a press has been mentioned, in some circumstances it could also be advantageous, where a multiple-daylight press is concerned, to provide a feed and discharge apparatus both at the entrance and at the exit of the press. This measure affords the possibility, when the press is open, to introduce into the press simultaneously from both sides, in order thereby to introduce double the quantity of board-shaped workpieces and at the same time remove the corresponding number of board-shaped workpieces from the press after the pressing operation.

In this case, a doubling of the production of the press can achieved automatically at a relatively modest outlay in terms of construction, both as regards the construction of the press and in terms of the design of the feed and discharge carriage.

I claim:

1. A machine for treatment of substantially board-shaped workpieces, comprising a press having a treating chamber with an inlet; and apparatus for admitting untreated workpieces into and for withdrawing treated workpieces from said chamber, including a carriage which is movable into and from said chamber through said inlet and said carriage having an upper side arranged to support an untreated workpiece during movement of said carriage into said chamber and an underside provided with means for gripping a treated workpiece during movement of said carriage out of said chamber.

2. The machine of claim 1, wherein said gripping means includes means for lifting a treated workpiece prior to movement of said carriage out of said chamber.

3. The machine of claim 1, wherein said apparatus further comprises a track and said carriage has rollers arranged to advance along said track while said carriage moves into and out of said chamber, said press having lateral sides and said tracks being substantially parallel to said lateral sides.

4. The machine of claim 1, wherein said upper side of said carriage is stationary relative to said gripper means.

5. The machine of claim 1, wherein said apparatus further comprises at least one belt conveyor and said upper side is provided on said at least one conveyor.

6. The machine of claim 1, wherein said gripping means comprises suckers connectable to a suction generating device.

7. The machine of claim 1, wherein said apparatus further comprises a conveyor disposed beneath said underside and arranged to receive treated workpieces from said gripping means outside of said chamber.

8. The machine of claim 7, wherein said conveyor is a roller conveyor.

9. The machine of claim 7, wherein said apparatus further comprises means for moving said conveyor up and down toward and away from said gripping means.

10. The machine of claim 1, wherein said apparatus further comprises means for moving said carriage into and out of said chamber.

11. The machine of claim 1, wherein said press has a second chamber with a second inlet and further comprising a second apparatus having a carriage which is movable into and out of said second chamber through said second inlet.

* * * * *